United States Patent
Clark et al.

[11] Patent Number: 5,951,733
[45] Date of Patent: Sep. 14, 1999

[54] MOLD APPARATUS AND METHOD FOR VACUUM FORMING GLASS SHEETS

[75] Inventors: Scott L. Clark, Oregon; Thomas L. Shaw, Findlay; Edward G. Bollin, Rossford; David B. Nitschke, Perrysburg, all of Ohio

[73] Assignee: Glasstech, Inc., Perrysburg, Ohio

[21] Appl. No.: 09/128,880

[22] Filed: Aug. 4, 1998

[51] Int. Cl.[6] .......................... C03B 11/06; C03B 23/035
[52] U.S. Cl. ............................. 65/106; 65/157; 65/287; 65/361
[58] Field of Search ................................ 65/64, 102, 106, 65/157, 273, 287, 291, 361

[56] References Cited

U.S. PATENT DOCUMENTS

| | | |
|---|---|---|
| 4,204,854 | 5/1980 | McMaster et al. . |
| 4,222,763 | 9/1980 | McMaster . |
| 4,483,702 | 11/1984 | Frank et al. . |
| 4,877,437 | 10/1989 | Nitschke . |
| 5,079,931 | 1/1992 | Lehto et al. . |
| 5,318,615 | 6/1994 | Nagai et al. . |
| 5,376,158 | 12/1994 | Shetterly et al. . |
| 5,672,189 | 9/1997 | Funk et al. . |
| 5,755,845 | 5/1998 | Woodward et al. . |

Primary Examiner—Steven P. Griffin
Attorney, Agent, or Firm—Brooks & Kushman P.C.

[57] ABSTRACT

Glass sheet forming apparatus (12) and a glass sheet forming method utilize a mold (20) having a curved forming face (22) with holes (26) in which a vacuum is drawn to form a glass sheet. A vacuum distributor (48) of the apparatus distributes a vacuum impulse of at least 0.1 atmospheres of vacuum from a valved vacuum reservoir (52) through a plurality of tubes (58) to a limited number of the holes (26) to provide additional forming of the glass sheet. The vacuum impulse distributor (48) is located within a vacuum chamber of the mold (20) that draws the vacuum by a gas jet pump in the holes (26) to which the vacuum impulse is not distributed.

10 Claims, 3 Drawing Sheets

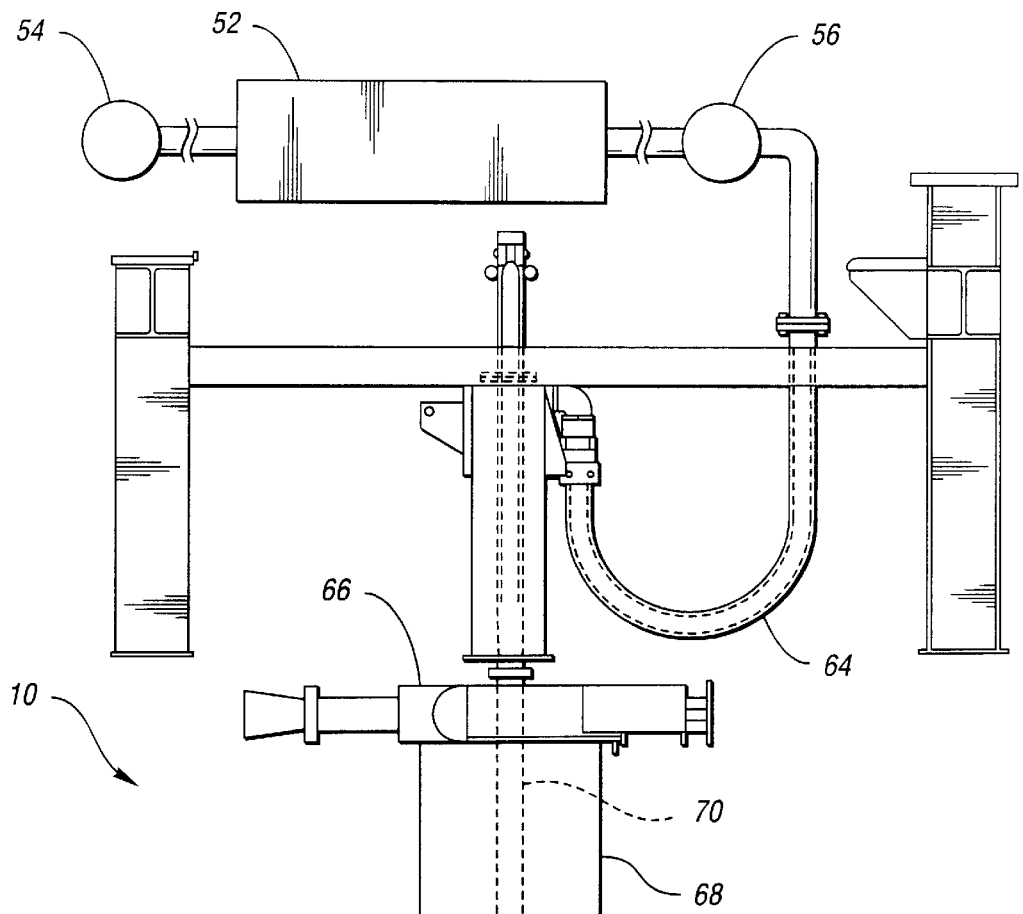
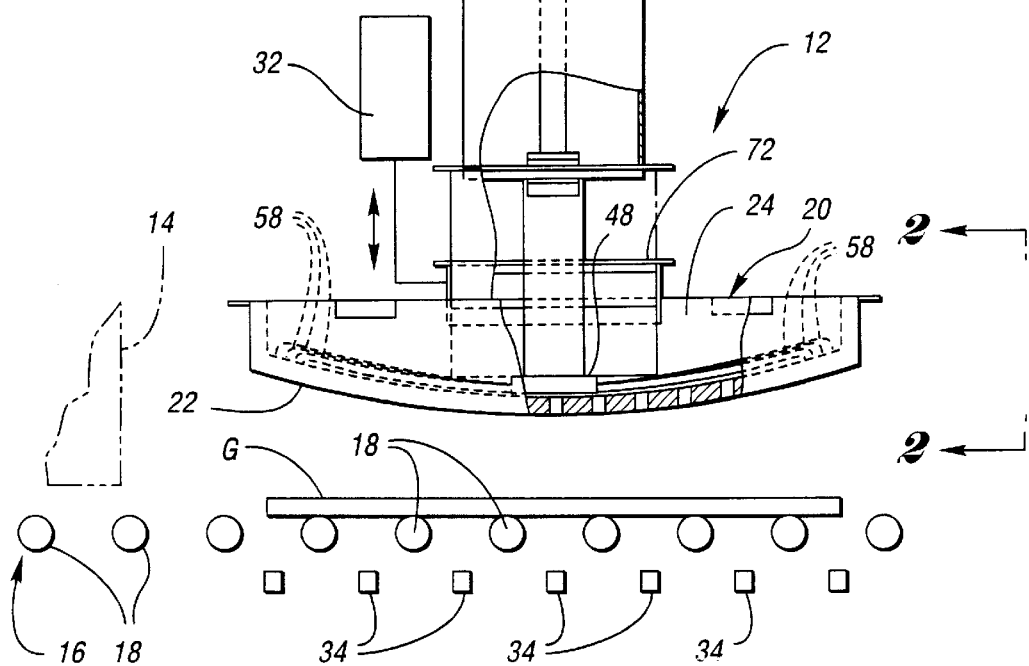
Fig. 1

MOLD APPARATUS AND METHOD FOR VACUUM FORMING GLASS SHEETS

TECHNICAL FIELD

This invention relates to mold apparatus and a method for vacuum forming a heated flat glass sheet.

BACKGROUND ART

Heated flat glass sheets are conventionally formed on vacuum molds utilizing a vacuum on the order of about 10 inches of water column, in other words about 0.025 atmospheres of vacuum. Such vacuums have previously been generated by gas jet pumps such as disclosed by U.S. Pat. No. 4,222,763 McMaster. Blowers can also be utilized to provide the vacuum that forms the glass sheet. In addition, forming of the glass sheet can be provided by separate chambers that provide different levels of vacuum to different areas of the mold such as disclosed by U.S. Pat. No. 4,877,437 Nitschke.

A recently introduced method for forming heated flat glass sheets utilizes a vacuum impulse generated from a vacuum reservoir as disclosed by U.S. Pat. No. 5,376,158 Shetterly et al. Such vacuum impulse forming utilizes a much greater level of vacuum than previously utilized such as on the order of 0.1 atmospheres of vacuum which is over four times the vacuum conventionally utilized to form glass sheets.

DISCLOSURE OF INVENTION

One object of the present invention is to provide improved glass sheet vacuum mold forming apparatus.

In carrying out the above object, the glass sheet vacuum mold forming apparatus of the invention includes a mold having a curved forming face and having a vacuum chamber in which a vacuum is drawn. The forming face has holes distributed thereover to communicate the vacuum chamber with the forming face to vacuum form a heated flat glass sheet on the forming face. A vacuum impulse distributor of the apparatus includes a vacuum impulse chamber in which a vacuum impulse of at least 0.1 atmospheres of vacuum is generated from a valved vacuum reservoir. A plurality of tubes extend from the vacuum impulse chamber of the vacuum impulse distributor to a limited number of holes in the forming face to provide a vacuum impulse that assists in the forming of the glass sheet.

In the preferred construction of the glass sheet vacuum mold forming apparatus, the vacuum impulse distributor is located within the vacuum chamber of the mold and also includes sides communicating the tubes with its vacuum impulse chamber.

The preferred construction of the glass sheet vacuum mold forming apparatus also includes a flexible conduit for communicating the valved vacuum reservoir and the vacuum impulse distributor while permitting movement of the mold. In addition, the apparatus also includes a gas jet pump for drawing a vacuum, a vacuum duct for communicating the gas jet pump and the vacuum chamber of the mold, and a rigid conduit that extends through the vacuum duct to communicate the flexible conduit and the vacuum impulse distributor. The vacuum duct includes a slide connection to the mold to permit movement of the mold with respect to the vacuum duct.

Another object of the present invention is to provide an improved method for vacuum forming a heated flat glass sheet.

In carrying out the above object, the method for vacuum forming a heated flat glass sheet in accordance with the invention is performed by distributing a vacuum from a vacuum chamber of a mold through holes in a curved forming face of the mold to vacuum form the heated flat glass sheet. The method also involves distributing a vacuum impulse of at least 0.1 atmospheres of vacuum from a vacuum impulse chamber of a vacuum impulse distributor through a plurality of tubes that extend from the vacuum impulse chamber to associated holes in the forming face of the mold to assist in the forming of the glass sheet.

In the preferred practice of the method, a gas jet pump draws the vacuum in the vacuum chamber of the mold, and a flexible conduit communicates a vacuum reservoir and the vacuum impulse chamber of the vacuum impulse distributor to draw the vacuum impulse and to permit movement of the mold.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is an elevational view of vacuum mold forming apparatus constructed in accordance with the present invention to perform the method of the invention.

BEST MODE FOR CARRYING OUT THE INVENTION

Figure 2:
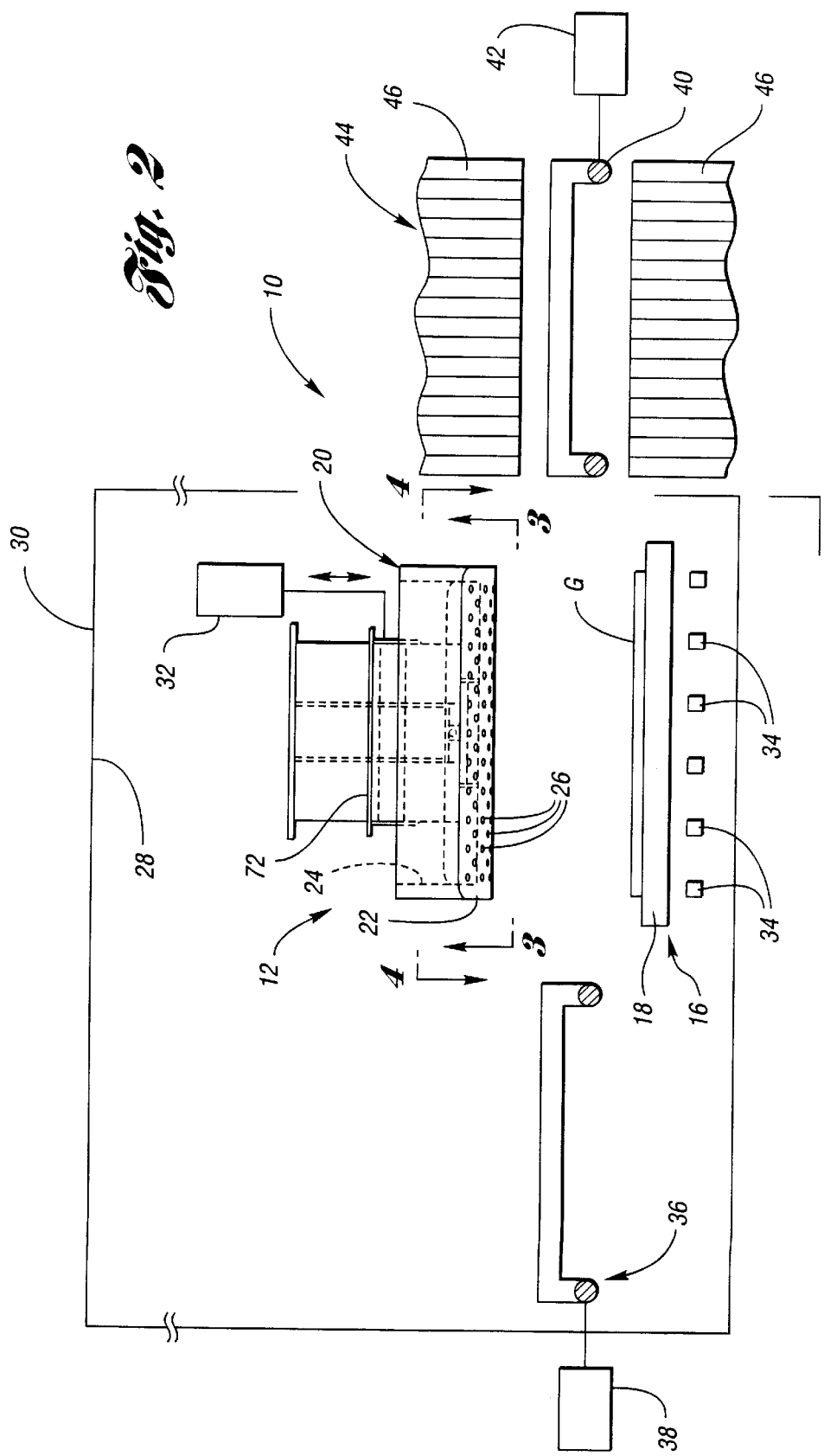
FIG. 2 is an elevational view taken along the direction of line 2—2 in FIG. 1 to further illustrate the vacuum mold forming apparatus.
Figure 3:
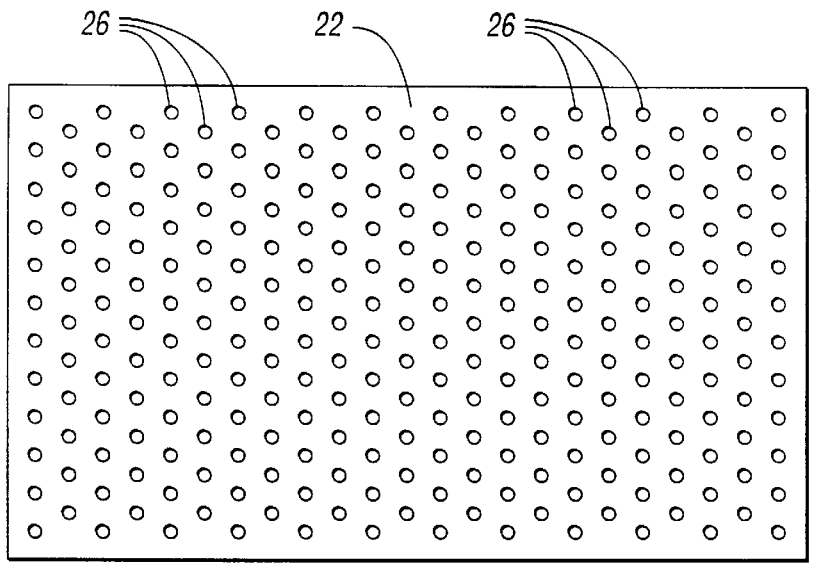
FIG. 3 is a bottom plan view taken along the direction of line 3—3 in FIG. 4 to illustrate a curved forming face of a vacuum mold of the apparatus.

With reference to FIGS. 1 and 2 of the drawings, a glass sheet forming system generally indicated by 10 includes glass sheet vacuum mold forming apparatus 12 constructed in accordance with the present invention to provide the method thereof as is hereinafter more fully described in an integrated manner to facilitate an understanding of the invention. The forming system 10 as shown in FIG. 1 includes a heating furnace 14 for heating glass sheets G to be formed while supported on a conveyor 16 which is illustrated as being of the roll-type including conveyor rolls 18 that are preferably made from sinter-bonded fused silica particles so as to have a low coefficient of thermal expansion. Apparatus 12 also includes a mold 20 that is positioned above the conveyor 16 and has a downwardly facing curved forming face 22. The mold 20 has a vacuum chamber 24 in which a vacuum of about 8 to 10 inches of water column is drawn as is hereinafter more fully described. Holes 26 are distributed over the forming face 22 as also shown in FIG. 3 and are communicated with the vacuum chamber 24 shown in FIG. 1 to vacuum form a heated flat glass sheet G on the forming face.

Before further describing the mold construction and operation, reference to FIG. 2 will facilitate an understanding of the specific manner in which the forming is performed with the mold in the illustrated system. The conveyor 16 and mold 20 are located within a heated chamber 28 of an insulated housing 30 and the mold is movable vertically under the operation of a suitable actuator 32. After a glass sheet G has been heated within the furnace 14 illustrated in FIG. 1, conveyance of the heated glass sheet to below the mold 20 is followed by downward movement of the mold under the operation of the actuator 32 to a position just adjacent the glass sheet. A vacuum is then drawn within the mold 20 as is hereinafter more fully described. An upward gas flow may also be provided by an array of gas jet pumps 34 below the conveyor such that the net effect is that the glass sheet is lifted upwardly from the conveyor and engaged with the curved forming face 22 of the mold. Actuator 32 then moves the mold 20 upwardly with the glass sheet thereon and a press ring 36 is thereafter moved by an actuator 38 toward the right as shown in FIG. 2 to below the mold 20. Downward movement of the mold 20 then presses the glass sheet between the mold forming face 22 and the press ring 36. Thereafter, upward movement of the mold 20 is followed by movement of the press ring 36 back toward the left under the operation of actuator 38. A cooling ring 40 is then moved by an actuator 42 from a cooling station 44 having upper and lower quench units 46 for providing cooling gas. Positioning of the cooling ring 40 below the mold 20 with the formed glass sheet thereon is followed by downward movement of the mold to release the formed glass sheet onto the cooling ring 40. The mold 20 is then moved upward and the cooling ring 40 is moved by the actuator 42 to the right between the upper and lower quench units 46 to provide cooling that anneals, heat strengthens, or tempers the glass sheet as desired.

Figure 4:
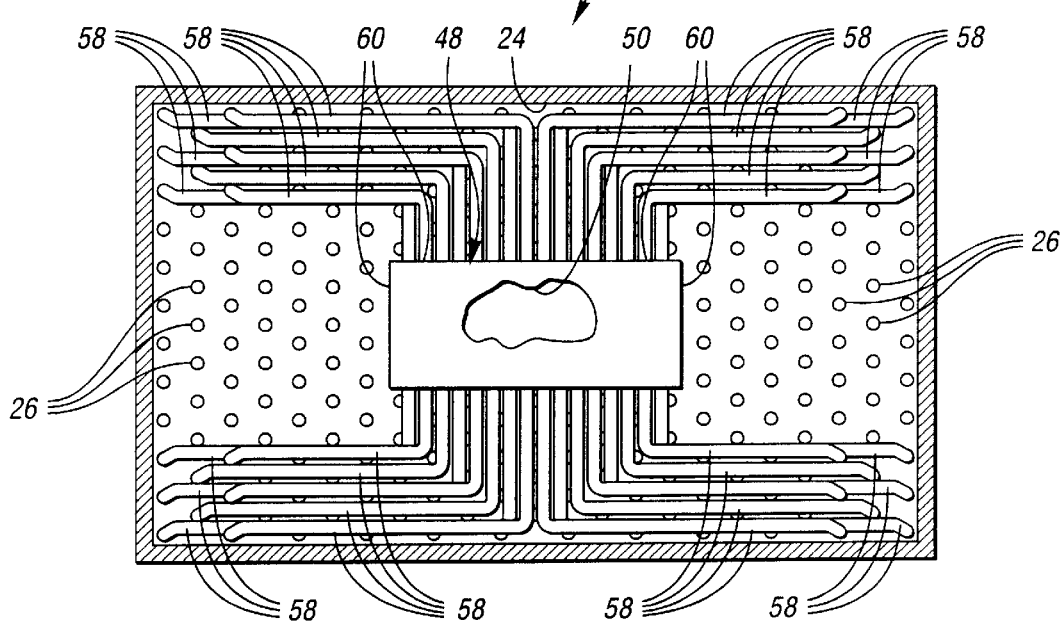
FIG. 4 is a sectional view of the vacuum mold taken along the direction of line 4—4 in FIG. 2 to illustrate a vacuum impulse distributor located within a vacuum chamber of the vacuum mold.

With reference to FIG. 4, a vacuum impulse distributor 48 of the apparatus includes a vacuum impulse chamber 50 in which a vacuum impulse of at least 0.1 atmospheres of vacuum is generated from a valved vacuum reservoir 52 shown in FIG. 1. A vacuum pump 54 draws the vacuum in the reservoir 52 and a valve 56 controls communication of the vacuum reservoir with the vacuum distributor 48 illustrated in FIG. 4. A plurality of tubes 58 extend from the vacuum impulse chamber 48 to a limited number of holes 26 in the forming face to provide a vacuum impulse that assists in the forming of the glass sheet at locations where additional forming is required. The vacuum impulse is preferably greater than 0.25 atmospheres of vacuum and most preferably greater than about 0.5 atmospheres of vacuum. Furthermore, the vacuum impulse is preferably applied for at least ½ second and preferably for no longer than 3 seconds with about 1½ seconds being most preferred to prevent marking or distortion of the glass sheet.

Provision of the individual tubes 58 for providing the additional vacuum impulse forming where required facilitates the mold manufacturing as compared to a vacuum chamber associated with a plurality of less than all of the holes, since each particular mold may require a different application of vacuum for a different number of holes in a manner that can easily be done with the individual tubes.

As illustrated in FIG. 1, the vacuum impulse distributor 48 is located within the vacuum chamber 24 of the mold 20 to facilitate the connection to the tubes 58 that distribute the vacuum. This vacuum distributor 48 as shown in FIG. 4 has sides 60 communicating the tubes 58 with its vacuum impulse chamber 50.

Figure 5:
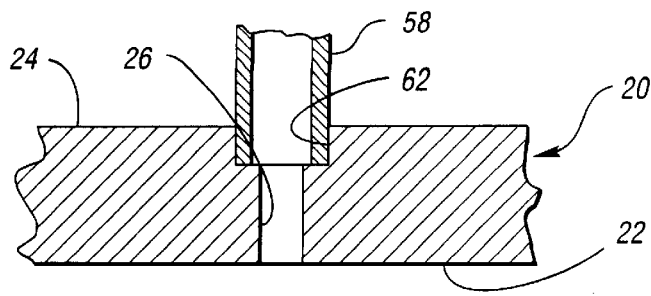
FIG. 5 is a sectional view that illustrates a connection between a vacuum impulse distribution tube and the curved forming face of the vacuum mold.

As illustrated in FIG. 5, the end of each tube 58 adjacent the mold forming face 22 is received within an enlarged inner end 62 of the associated hole 26. Furthermore, the hole 26 outward from its enlarged inner end 62 has a size that is greater than the internal diameter of the tube 58 to facilitate the vacuum distribution. The tubes 58 actually utilized have an outer diameter of 5/16 of an inch (about 0.8 cm.) and an inner diameter of ¼ of an inch (about 0.64 cm.), while the mold holes 26 have a diameter of 3/16 of an inch (about 0.48 cm.).

As illustrated in FIG. 1, the vacuum forming apparatus includes a flexible conduit 64 that communicates the valved vacuum reservoir 52 with the vacuum distributor 48 so as to permit vertical movement of the mold 20 during the glass sheet forming operation as previously described. A gas jet pump 66 such as of the type disclosed by U.S. Pat. No. 4,222,763 is mounted on the upper end of a vacuum duct 68 which communicates the gas jet pump with the vacuum chamber 24 of the mold 20. A rigid conduit 70 of the apparatus extends through the vacuum duct 68 to communicate the flexible conduit 64 with the vacuum distributor 48. Furthermore, the duct 68 includes a slide connection 72 to the mold 20 to permit movement of the mold with respect to the vacuum duct under the operation of the actuator 32 while still providing the communication of the gas jet pump 66 with the mold vacuum chamber 24.

While the preferred apparatus and method for carrying out the invention have been described in detail, those familiar with the art to which this invention relates will recognize various alternative designs and embodiments for practicing the invention as defined by the following claims.

What is claimed is:

1. Glass sheet vacuum mold forming apparatus, comprising:

a mold having a curved forming face and having a vacuum chamber in which a vacuum is drawn, and the forming face having holes distributed thereover to communicate the vacuum chamber with the forming face to vacuum form a heated flat glass sheet on the forming face;

a vacuum impulse distributor including a vacuum impulse chamber in which a vacuum impulse of at least 0.1 atmospheres of vacuum is generated from a valved vacuum reservoir; and a plurality of tubes extending from the vacuum impulse chamber of the vacuum impulse distributor to a limited number of holes in the forming face to provide a vacuum impulse that assists in the forming of the glass sheet.

2. Glass sheet vacuum mold forming apparatus as in claim 1 wherein the vacuum impulse distributor is located within the vacuum chamber of the mold.

3. Glass sheet vacuum mold forming apparatus as in claim 2 wherein the vacuum impulse distributor includes sides communicating the tubes with its vacuum impulse chamber.

4. Glass sheet vacuum mold forming apparatus as in claim 2 further including a flexible conduit for communicating the valved vacuum reservoir and the vacuum impulse distributor while permitting movement of the mold.

5. Glass sheet vacuum mold forming apparatus as in claim 4 further including a gas jet pump for drawing a vacuum, a vacuum duct for communicating the gas jet pump and the vacuum chamber of the mold, and a rigid conduit that extends through the vacuum duct to communicate the flexible conduit and the vacuum impulse distributor.

6. Glass sheet vacuum mold forming apparatus as in claim 5 wherein the vacuum duct includes a slide connection to the mold to permit movement of the mold with respect to the vacuum duct.

7. Glass sheet vacuum mold forming apparatus, comprising:

a mold having a curved forming face and having a vacuum chamber, and the forming face having holes distributed thereover to communicate the vacuum chamber with the forming face;

a gas jet pump for drawing a vacuum within the vacuum chamber of the mold to vacuum form a heated flat glass sheet on the forming face of the mold;

a vacuum impulse distributor located within the vacuum chamber of the mold and including a vacuum impulse chamber;

a valved vacuum reservoir communicated with the vacuum impulse distributor to generate a vacuum impulse of at least 0.1 atmospheres of vacuum; and a plurality of tubes extending from the vacuum impulse chamber of the vacuum impulse distributor to a limited number of holes in the forming face to provide a vacuum impulse that assists in the forming of the glass sheet.

8. Glass sheet vacuum mold forming apparatus, comprising:

a mold having a curved forming face and having a vacuum chamber, and the forming face having holes distributed thereover to communicate the vacuum chamber with the forming face;

a gas jet pump for drawing a vacuum within the vacuum chamber of the mold to vacuum form a heated flat glass sheet on the forming face of the mold;

a vacuum impulse distributor located within the vacuum chamber of the mold and including sides and a vacuum impulse chamber;

a valved vacuum reservoir communicated with the vacuum impulse distributor to generate a vacuum impulse of at least 0.1 atmospheres of vacuum; and a plurality of tubes extending from the vacuum impulse chamber of the vacuum impulse distributor through the sides thereof to a limited number of holes in the forming face to provide a vacuum impulse that assists in the forming of the glass sheet.

9. A method for vacuum forming a heated flat glass sheet comprising:

distributing a vacuum from a vacuum chamber of a mold through holes in a curved forming face of the mold to vacuum form the heated flat glass sheet; and distributing a vacuum impulse of at least 0.1 atmospheres of vacuum from a vacuum impulse chamber of a vacuum impulse distributor through a plurality of tubes that extend from the vacuum impulse chamber to associated holes in the forming face of the mold to assist in the forming of the glass sheet.

10. A method for forming a heated flat glass sheet as in claim 9 wherein a gas jet pump draws the vacuum in the vacuum chamber of the mold, and wherein a flexible conduit communicates a vacuum reservoir and the vacuum impulse distributor to draw the vacuum impulse and to permit movement of the mold.

* * * * *